UNITED STATES PATENT OFFICE.

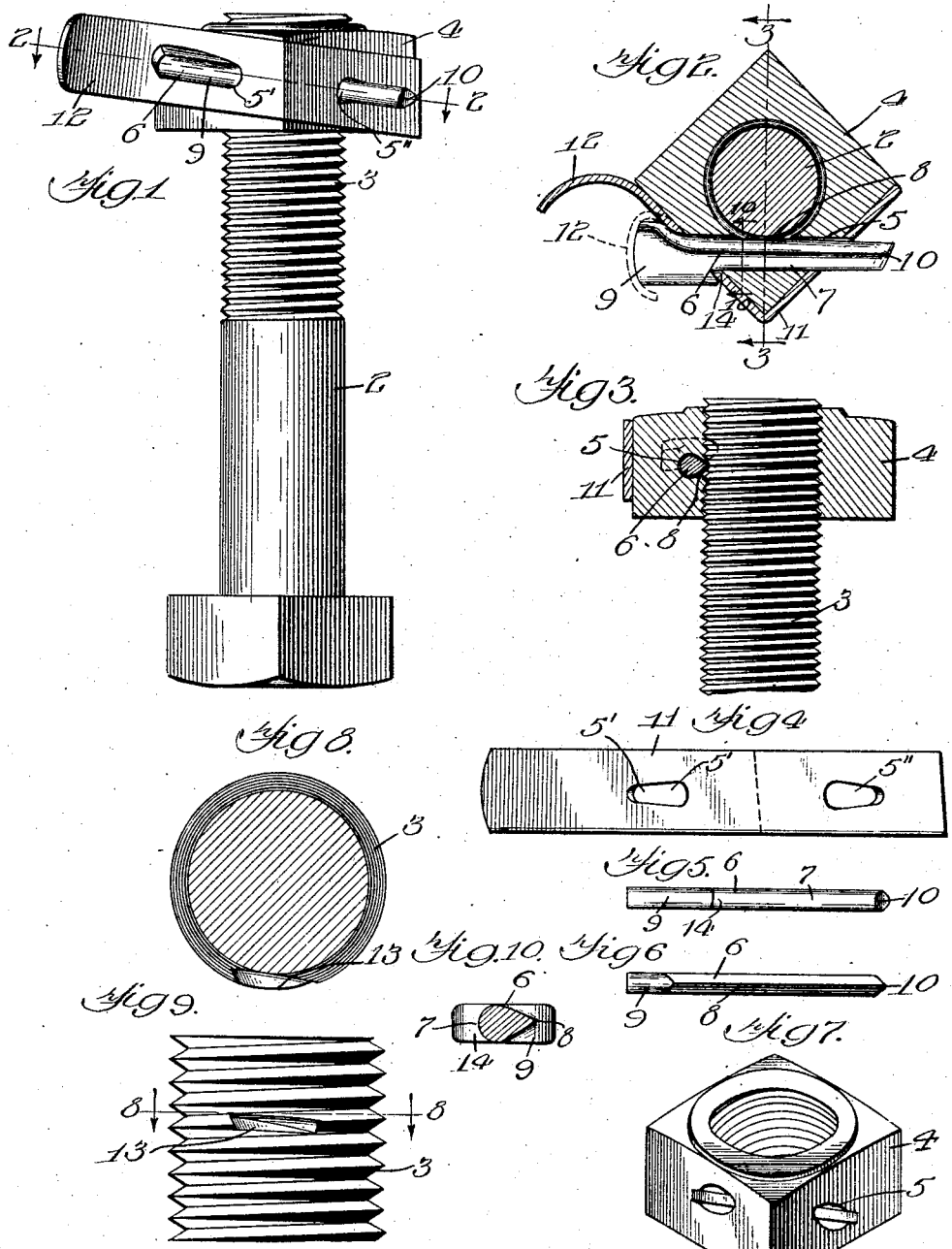

JOHN O. OLSEN AND ALBERT J. GIDLUND, OF CHICAGO, ILLINOIS.

NUT-LOCK.

1,047,691.  Specification of Letters Patent.  Patented Dec. 17, 1912.

Application filed April 18, 1912. Serial No. 691,697.

*To all whom it may concern:*

Be it known that we, JOHN O. OLSEN and ALBERT J. GIDLUND, subjects, respectively, of the King of Norway and the King of Sweden, and both residents of Chicago, Cook county, Illinois, have invented certain new and useful Improvements in Nut-Locks, of which the following is a specification.

Our invention relates to nut-locks, and consists in a new and improved form of lock hereinafter described in detail, illustrated in the accompanying drawing and incorporated in the appended claims.

In the drawing—Figure 1 is an exterior view of a bolt and nut equipped with our invention. Fig. 2 is a section taken on line 2—2 of Fig. 1. Fig. 3 is a section taken on line 3—3 of Fig. 2. Figs. 4, 5, 6, and 7 are detail views. Fig. 8 is a section taken on the line 8—8 of Fig. 9. Fig. 9 is an enlarged section of the threaded portion of the bolt, showing the recess formed across a thread of the bolt by the wedge, key, or cross-bar of the lock. Fig. 10 is a section taken on the line 10—10 of Fig. 3.

Referring in detail to the several views, 2 represents a bolt having a threaded portion 3 and a nut 4 thereon. Across one corner of this nut is a bore 5 which, as shown in Fig. 1, extends at an angle to the threads and to the plane of the nut, intersects the circle of the nut-opening, as shown in Fig. 2, and crosses the threads on the bolt. A wedge-key 6 is provided to occupy the bore 5. One of the broad sides of this key is shown in Fig. 2, a rear edge 7 thereof is shown in Fig. 5 and a wedge-shaped edge 8 thereof is shown in Fig. 6. The latter edge is engaged with a thread of the bolt. The wedge 8 extends throughout the length of the body of the key, the head of which is designated as 9. The opposite end, or tip, of the key is formed into a wedge 10 by beveling said tip across the width of the key, the wedge-edge 8 being formed by bevels across the thickness of the key, or in planes intersecting the planes of the bevel 10.

11 is a strip of metal bent at right angles to lie against two sides of the nut and is provided with openings 5′ and 5″ which register with the opening or bore 5 when said strip is in its proper position. An extension 12 of the strip 11 is bent over the head 9 of the key, as indicated by dotted lines in Fig. 2 to hold said key in place, the strip 11, in turn, being held in place by the key through its engagement of the openings or holes 5′ and 5″.

In the operation of our improved lock, the nut may be locked on any portion of the threaded bolt length, not only against retrograde but against forward movement, by driving in the wedge 6 through the openings 5, 5′ and 5″. As the wedge 10 encounters the thread in its path it cuts a channel 13 diagonally across the thread, as shown in Figs. 8 and 9, as well as in Figs. 2 and 3 and the wedge 8 facilitates the formation of the groove or score 13, as the width of the key is tapered from the head 9 to the tip 10 as shown in Fig. 2. Hence the wedge 10 makes only an initial small cut which is then deepened to the desired extent by forcing the key 6 inward. A limit to the inward movement of the key, and a check upon unnecessary force or damage to the bolt, is provided by a hook or shoulder 14 on the head 8 which comes into contact with the strip 11 when the intended indentation of the thread, as at 13, has been made. When the wedge-key 6 has been driven in to the desired depth it is positively locked against accidental displacement by bending over its head the part 12 of the strip 11. When it is desired to remove the nut the part 12 may be bent back to free the head of the key after which the key may be driven out by a hammer-blow on its tip 10.

In the present invention the lock of the nut is not dependent upon a close or tight contact of the nut against the part it holds in place, as the operation of the wedge 8 in the indentation 13 is to check the nut against turning with equal positiveness in both directions of rotation; hence the lock is well adapted for bolts or rods mounted to have longitudinal movement, the head and the nut of the rod or bolt serving then merely as stops for such longitudinal movement.

Having thus described our invention we claim as new and desire to secure by Letters Patent—

1. The combination with a threaded nut and bolt, of a key forming a key-way across a single thread of said bolt and keying said nut against rotation relative to said bolt and a locking strip locked to said key and nut by said key and locking said key to said nut.

2. The combination with a threaded bolt and a nut having threaded engagement therewith, of a bore through said nut, said bore intersecting a thread of the bolt, a wedge-key, and a single locking means for locking said key to said nut and for locking said locking means to said key.

3. The combination with a bolt and nut having threaded engagement with each other, of a key-way through said nut and bolt, a key in said key-way arranged at an angle to the axis of said bolt, and a lock retained by said key, said lock retaining said key on said nut.

4. The combination with a bolt and nut having threaded engagement with each other, of a hole through said nut which extends at an angle to its threads, a key having a beveled edge and end for forming a key-way across a thread of said bolt, and a lock which retains said key in place, said lock being itself retained in place by said key.

5. The combination with a threaded bolt and nut, said nut having a hole therethrough which intersects the circle of the bolt-hole in said nut, of a key-wedge having a beveled edge adapted to cut a key-way across a thread of said bolt, a strip of metal engaging two sides of said nut and having holes which register with the hole through said nut, said key engaging said strip of metal and said strip of metal adapted to be engaged with said key to prevent its displacement.

In testimony whereof we have hereunto set our hands in the presence of two subscribing witnesses.

JOHN O. OLSEN.
ALBERT J. GIDLUND.

Witnesses:
MILTON LENOIR,
J. W. BECKSTROM.

Copies of this patent may be obtained for five cents each, by addressing the "Commissioner of Patents, Washington, D. C."